May 29, 1923.
M. W. LINK
1,456,740
FRONT RADIUS ROD
Filed March 19, 1921
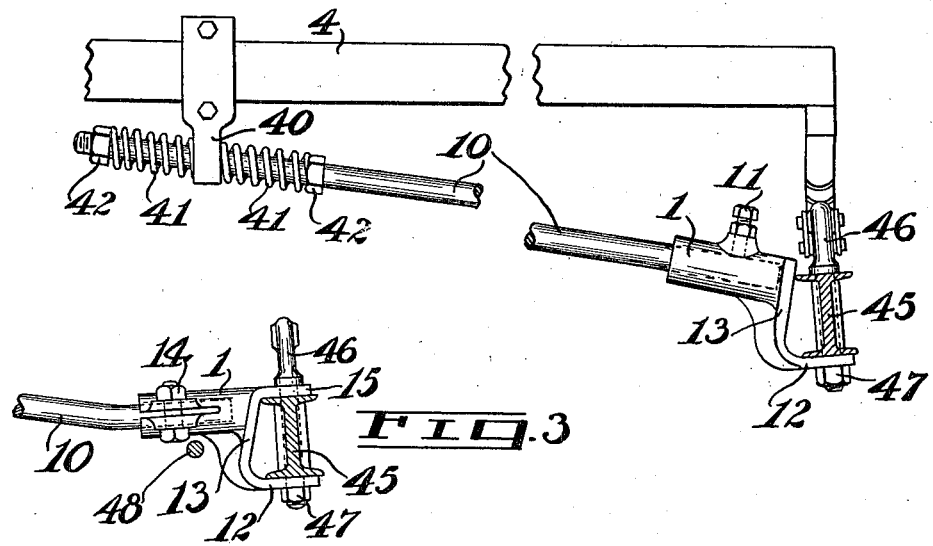
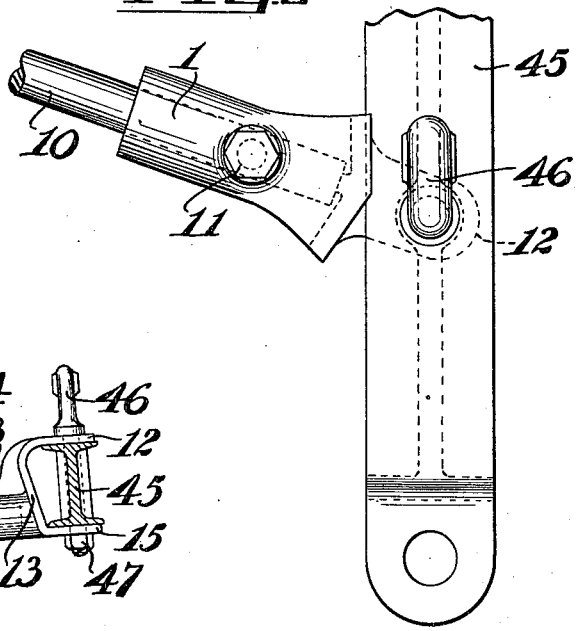
INVENTOR
Manfred W. Link
BY
H. L. + C. L. Reynolds
ATTORNEYS Patented May 29, 1923.

1,456,740

UNITED STATES PATENT OFFICE.

MANFRED W. LINK, OF KANSAS CITY, MISSOURI.

FRONT RADIUS ROD.

Application filed March 19, 1921. Serial No. 453,728.

*To all whom it may concern:*

Be it known that I, MANFRED W. LINK, a citizen of the United States of America, and resident of the city of Kansas City, in the county of Jackson and State of Missouri, have invented certain new and useful Improvements in Front Radius Rods, of which the following is a specification.

My invention relates to front radius rods for automobiles or other vehicles.

The object of my invention is to provide a radius rod which will supplement or supplant the present front radius rod or wishbone in use upon a certain well-known make of automobile, and which can be quickly and easily attached to the car.

A further object of my invention is to provide such a radius rod which may be secured to the front axle by means of a single bolt which is a standard part of this particular car, or similar securing means, and which will securely hold the axle against jolts, jars and other displacing strains encountered on the road.

Another object of my invention is to provide such a radius rod which will securely hold the front axle and yet which permits a certain amount of yielding lengthwise of the car, and which may be adjustable in its effective length.

My invention comprises those novel parts and combinations thereof which are shown in the accompanying drawings, described in the specification, and particularly defined by the claims terminating the same.

In the accompanying drawings I have shown my invention in forms which are now preferred by me.

Figure 1 is a side elevation of my radius rod shown attached to a vehicle, the axle being shown in section.

Figure 2 is a plan of a portion of the axle and of the forward end of the radius rod.

Figure 3 is an elevation of a slightly modified form, illustrating one manner of attachment.

Figure 4 is an elevation of the same form, showing a different manner of attachment.

The rear end of the radius rod is attached in some suitable manner, preferably to the beam 4 forming a part of the vehicle chassis. The manner of securing this rear end may be any that is found suitable or desirable. As shown herein it consists of a hanger 40 through which the rear end of the rod 10 passes, springs 41 being placed about the end of the rod at each side of the hanger 40 and being secured in place by set nuts 42. The object of the mounting described is to provide a slightly yielding suspension for the rear end of the rod, and any other suitable form may be employed.

At its forward end the rod 10 terminates in a clamping block 1. This may form a part of the rod 10 itself or may be separate therefrom, as shown herein, the rod being adjustably secured therein and held in place by the set screw 11, or as shown in Figures 3 and 4, by the bolt and nut 14, the block being slotted. The clamping block 1 has a forwardly projecting toe 12 which is adapted to extend beneath the axle 45 of the vehicle. The clamping block has also one or two upright faces 13 which are adapted to contact with the rear side of the axle 45. One or two of these faces 13 may be provided, although I prefer to employ two as shown in Figure 2. This permits the same rod and clamping block to be used upon either side of the vehicle interchangeably, the point of securement of the forward end of the rod being to one side, and preferably outside, of the line of the chassis beam 4. This necessitates the two faces 13, if two are used, being relatively angularly disposed.

The toe 12 is perforated or otherwise adapted to receive an end of a spring perch bolt 46 which extends vertically through the axle 45. A nut 47 threaded upon the end of the bolt 46 clamps the toe 12 beneath the axle. The face 13 and the plane of the toe 12 are relatively disposed at an angle somewhat less than a right angle. The toe 12 may be inclined upwardly or the face 13 inclined forwardly, or both. The object of this construction is to have the face 13 contact tightly against the rear side of the upper flange of the axle 45, when the toe 12 is clamped beneath the axle. In the form shown this causes the vertical axis of the axle to be inclined slightly and to be projected forwardly of its normal position. Shocks encountered upon the road will in practically all cases tend to throw the axle rearwardly, this tendency being resisted by the rod 10, but a slight yielding is permitted by the springs 41.

It will be noted that the rod is connected to the axle only through the nut 47 clamping its toe 12 beneath the axle. At the same time the faces 13 contact firmly and securely with the rear edge of the upper flange of the axle, substantially in line with the main rod 10. All strains are transmitted longitudinally of the rod and are taken up in the springs 41, whose strength can be adjusted by means of the nuts 42. The device may be attached quickly to the axle without disturbing the parts of the car other than by the removal and replacement of the nut 47. The screwing up of the nut 47 in effect clamps the axle between this nut, bolt 46, and the faces 13 of the clamping block so that it is securely held against displacement, and so that the face 13 is always in contact therewith to transmit road strains rearwardly to the frame.

In Figures 3 and 4 I have shown a slightly modified form of clamping block, illustrating in these two figures how this or my preferred form may be attached in two different ways, right side up or inverted. The clamping block 1 of this form has an upper toe 15 which projects forwardly over the upper flange of the axle 45. This toe 15 may be perforated or otherwise formed to permit the projection therethrough of the spring perch bolt 46, which may be seated thereon. If inverted, the toe 15 lies beneath the axle 45, while the toe 12 lies thereabove. In this shape the strains placed upon the lower portion of the axle 45 will be more directly communicated to the radius rod. In either position, that of Figure 3 or that of Figure 4, the radius rod will avoid the steering rod, the position of which is shown at 48. The two positions may be changed about at will, from one to the other.

What I claim as my invention is:

1. A front radius rod for automobiles terminating at its forward end in a clamping block having a toe projecting forward beneath the vehicle axle and adapted to be secured thereto, and an upright face adapted to contact with the rear side of the axle, said toe and upright face being so positioned relatively as to clamp the vehicle axle therebetween when in secured position.

2. The combination with a vehicle front axle and a spring-perch bolt passing vertically therethrough, of a front radius rod terminating at its forward end in a clamping block having a toe projecting forward beneath the axle and adapted to receive said spring-perch bolt to be thereby secured to the axle, and having a forwardly inclined upright face adapted to contact with the rear side of the upper flange of the axle below its upper end, and a nut threaded upon said spring-perch bolt to clamp said toe to the axle, said upright face being so positioned relative to said toe that it is clamped tightly against the axle flange when said nut is tightened upon the spring-perch bolt.

3. A front radius rod for automobiles terminating at its forward end in a clamping block having a toe projecting forwardly beneath the vehicle axle and adapted to be secured thereto, and an upright face adapted to contact with the rear side of the axle, said toe and upright face being disposed at an angle of somewhat less than ninety degrees whereby the axle is drawn into and firmly held in the angle between the toe and upright face when the clamping block is secured upon the axle.

4. In combination, a front radius rod for automobiles terminating at its forward end in a clamping block having a toe projecting forwardly beneath the vehicle axle and adapted to be secured thereto at a point laterally offset from the longitudinal chassis beam, and having two upright faces relatively angularly disposed, and means for securing the rear end of said rod to the chassis beam, one of said upright faces being then adapted to contact with the rear face of the axle.

5. In combination with a vehicle axle and a spring-perch bolt passing vertically therethrough, a front radius rod terminating at its forward end in a clamping block having a toe projecting forwardly beneath the axle and perforated to receive the end of said bolt, and having an upright face adapted to contact with the rear edge of the upper flange of said axle, said face being inclined forwardly relative to the toe at an angle somewhat less than ninety degrees, and a nut threaded upon the lower end of said bolt and operable when drawn tight to clamp said upright face into firm contact with the axle.

6. In combination with a vehicle axle and a spring-perch bolt passing vertically therethrough, a front radius rod terminating at its forward end in a clamping block having a toe projecting forwardly beneath the axle and perforated to receive the end of said bolt, and having two upright faces relatively angularly disposed and each selectively adapted to contact with the rear edge of the upper flange of said axle, said face being disposed relative to the toe at an angle somewhat less than ninety degrees, and a nut threaded upon said bolt to clamp one of said upright faces into firm contact with the rear face of the axle.

Signed at Kansas City, Missouri, this 3rd day of February, 1921.

MANFRED W. LINK.